United States Patent [19]

Brynestad et al.

[11] Patent Number: 4,503,021

[45] Date of Patent: Mar. 5, 1985

[54] PREPARATION OF TITANIUM DIBORIDE POWDER

[75] Inventors: Jorulf Brynestad; Carlos E. Bamberger, both of Oak Ridge, Tenn.

[73] Assignee: The United States of America as represented by the Department of Energy, Washington, D.C.

[21] Appl. No.: 488,870

[22] Filed: Apr. 26, 1983

[51] Int. Cl.$^3$ .............................................. C01B 35/04
[52] U.S. Cl. ..................................... 423/297; 423/492
[58] Field of Search .................. 423/297, 492; 501/96

[56] References Cited

U.S. PATENT DOCUMENTS

| | | | |
|---|---|---|---|
| 3,244,482 | 4/1966 | Culbertson et al. | 423/297 |
| 3,253,886 | 5/1966 | Lamprey et al. | 423/297 |
| 3,723,601 | 3/1973 | Svanstrom | 423/297 |
| 3,979,500 | 9/1976 | Sheppard et al. | 423/289 |
| 4,282,195 | 8/1981 | Hoekje | 423/289 |

OTHER PUBLICATIONS

Matkovich, V. I. *Boron and Refractory Borides*, Springer-Verlag, New York, (1977), pp. 361–374.

Philippe Pichat "Preparation de borures au moyen de trifluorure de bore.", C. R. Acad. Sc. Paris Series C, (Aug. 7, 1967), pp. 385–387.

*Primary Examiner*—John Doll
*Assistant Examiner*—Jackson Leeds
*Attorney, Agent, or Firm*—Irving Barrach; Stephen D. Hamel

[57] ABSTRACT

Finely-divided titanium diboride or zirconium diboride powders are formed by reacting gaseous boron trichloride with a material selected from the group consisting of titanium powder, zirconium powder, titanium dichloride powder, titanium trichloride powder, and gaseous titanium trichloride.

1 Claim, No Drawings

PREPARATION OF TITANIUM DIBORIDE POWDER

BACKGROUND OF THE INVENTION

This invention, which resulted from a contract with the United States Department of Energy, relates generally to the preparation of metal boride powders suitable for use as refractory materials when sintered, and more specifically it relates to the preparation of submicron and amorphous metal boride powders by direct chemical synthesis.

Because of their outstanding refractory properties, certain borides, such as titanium diboride and zirconium diboride, are highly desirable materials for the fabrication of products used in situations where physical erosion, chemical corrosion, and very high temperatures are involved. The most widely used commercial process for preparing titanium diboride is the carbothermic process or modifications thereof. In this process, titanium dioxide (TiO$_2$), boron oxide (B$_2$O$_3$), and carbon are usually heated in an electric arc or high frequency furnace to form titanium diboride. A variation of the process is to use B$_4$C instead of B$_2$O$_3$ as the boron source. The titanium diboride products obtained from these aforementioned processes are mechanically ground and milled. To obtain a finely divided product, extensive milling is required, but even very lengthy milling does not reduce the particle size of the product to less than about 2,000-10,000 nm (2-10 microns). Moreover, such a product is contaminated with impurities abraded from the construction materials of the mill and grinding machine, as well as oxides of titanium and of boron formed by particle surface oxidation by oxygen from the ambient atmosphere.

Another direct powder preparation method, described in (U.S. Pat. No. 4,282,195, consists of reacting in the vapor phase titanium tetrahalide and a boron source (boron hydride or boron halide) in the presence of a hot hydrogen gas stream produced by a hydrogen plasma heater in the absence of oxygen. The solid boride formed is quenched and recovered in fine particle collection equipment. This method yields products where substantailly all (at least 90%) of the particles have a nominal section diameter of less than one micron; the predominant number (greater than 50%) of the particles lss than one micron are in the particle size range of between 0.05 and 0.7 microns (50-700 nm). Powder products can be obtained containing less than 0.25 weight percent oxygen and less than 0.20 weight percent chlorine.

The aforementioned process is strongly endothermic, i.e. the process requires addition of energy from an external source in order to proceed. Therefore, as soon as a titanium diboride particle is formed, its surface will absorb energy from radiation and hence serve as a seed for secondary particle growth. This results in a lower limit in obtainable particle size; this apparently is about ~0.05 microns (i.e., 50 nm). However, it is highly desirable to be able to prepare powders with even smaller particle size, preferably all the way down to the amorphous state, thus providing a product that is more amenable to pressing and sintering into dense useable forms.

SUMMARY OF THE INVENTION

The present invention provides a new method for the direct chemical synthesis of submicron and amorphous titanium diboride (TiB$_2$) or zirconium diboride (ZrB$_2$) powder. The method comprises the two basic approaches of (1) reacting gaseous boron trichloride (BCl$_3$) with gaseous titanium trichloride (TiCl$_3$) at ~1300° C., to yield the solid TiB$_2$ and gaseous titanium tetrachloride (TiCl$_4$) and (2) reacting gaseous boron trichloride (BCl$_3$) with a solid titanium halide, such as TiCl$_2$ or TiCl$_3$, titanium metal, or zirconium metal, at elevated temperatures to yield solid TiB$_2$ or ZrB$_2$ and gaseous TiCl$_4$. The product TiB$_2$ and ZrB$_2$ powder from these reactions has a particle size range from amorphous to ~100 nanometers (nm) which may be several orders of magnitude smaller than is obtained by any other known method.

DETAILED DESCRIPTION OF THE PREFERRED EMBODIMENTS OF THE INVENTION

One new method for the preparation of submicron and amorphous refractory TiB$_2$ in accordance with the invention employs exothermic reactions in the gas phase, the metal boride being formed by homogeneous nucleation from reactants in the gase phase by a sequence of exothermic reactions. For example, gaseous titanium trichloride and boron trichloride undergo the following overall net reaction:

$$10\text{TiCl}_3(g) + 2\text{BCl}_3(g) \xrightarrow{\sim 900°-1300° \text{ C.}} \text{TiB}_2(s) + 9\text{TiCl}_4(g). \quad (1)$$

This reaction goes to virtual completion at temperatures below ~1300° C., with lower temperatures being preferable. The titanium trichloride gas is produced by the reaction:

$$3\text{TiCl}_4(g) + \text{Ti}(s) \xrightarrow{\sim 1200°-\sim 1300° \text{ C.}} 4\text{TiCl}_3(g) \quad (2)$$

This reaction takes place smoothly at temperatures in the temperature range ~1200° C.-~1300° C. At lower temperatures, formation of titanium dichloride may present a physical problem by plugging the tubing. The gaseous titanium trichloride is brought into contact with gaseous boron trichloride in a reactor at temperatures between ~900° C. and ~1300° C. to effect reaction (1). Experiments have yielded powders in the range amorphous to ~100 nanometers (nm).

A second approach employs heterogeneous reactions involving gaseous boron trihalide. One of the reactants is a solid such as the metals titanium, zirconium, hafnium, or low-valence compounds thereof, e.g., solid titanium trichloride, solid titanium dichloride, etc.

In the case of solid titanium trichloride, the overall net reaction is:

$$10\text{TiCl}_3(s) + 2\text{BCl}_3(g) \xrightarrow{\sim 600°-\sim 750° \text{ C.}} \text{TiB}_2(s) + 9\text{TiCl}_4(g). \quad (3)$$

In the case of solid titanium dichloride, the net reaction is:

$$5\text{TiCl}_2(s) + 2\text{BCl}_3(g) \xrightarrow{\sim 600°-\sim 1100° \text{ C.}} \text{TiB}_2(s) + 4\text{TiCl}_4(g), \quad (4)$$

and, in the case of titanium metal as starting material,

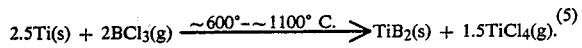

$$2.5\text{Ti(s)} + 2\text{BCl}_3(g) \xrightarrow{\sim 600^\circ - \sim 1100^\circ \text{ C.}} \text{TiB}_2(s) + 1.5\text{TiCl}_4(g). \quad (5)$$

Reaction (3), using solid titanium trichloride powder with particles sizes larger than one micron, yielded stoichiometric amounts of titanium diboride powder with particle sizes in the range of 0.1 nm to 50 nm when the reaction was conducted at 630° C.

Reaction (5), using titanium metal sponge (−4 to +40 mesh) at 630° C. yielded stoichiometric amounts of titanium diboride powder with particle or particle cluster sizes in the range 1 nm to 100 nm, whereas −325 mesh titanium powder at 630° C. yielded stoichiometric amounts of titanium diboride powder with particle sizes less than 50 nm, mixed with amorphous material. At 700° C., reaction (5) yielded particle sizes in the range of ∼1 nm to 100 nm.

Reaction (4) has not been tested separately, but solid titanium dichloride has been observed as an intermediate product when reaction (5) has been interrupted before going to completion. This indicates that titanium dichloride reacts according to reaction (4).

It is believed that the principle of employing exothermic gas reaction sequences for producing highly disperse powders of refractory compounds may be extended to carbides and nitrides as well as borides other than those mentioned above, and to mixtures thereof.

EXAMPLE I

Gaseous $TiCl_4$ was preheated to about 1230° C. and passed over titanium metal granules at ∼1230° C. in a graphite reactor. The $TiCl_3$ generated was brought into the graphite reaction chamber at ∼1230° C. and mixed with $BCl_3$ gas. The $BCl_3/TiCl_3$ mole ratio was about 1/3, i.e., $BCl_3$ was in stoichiometric excess relative to Eq. (1) above. The reaction products, $TiB_2$ and $TiCl_4$, were collected at room temperature in a glass container, the highly disperse $TiB_2$ powder being retained by the liquid $TiCl_4$. The $TiCl_4$ was separated from the $TiB_2$ powder by distillation (at reduced pressures). The powder was transferred to an inert atmosphere glove box with water levels less than 0.5 ppm and oxygen levels less than 0.2 ppm, and kept in closed containers when not in use. The powder was pyrophoric, as demonstrated by exposing a sample to air. X-ray diffraction analysis of the product showed it to be $TiB_2$; it was concluded from the high background that the product contained amorphous particles, and the extent of line broadening indicated that the crystalline part was very fine (∼100 nm or less). Analysis by Transmission Electron Microscopy (TEM) showed that the powder consisted mainly of amorphous material mixed with crystallites and crystallite aggregates in the range ∼0.1 nm to ∼100 nm.

EXAMPLE II

Solid $TiCl_3$ powder was placed in a nickel metal reactor and gaseous $BCl_3$ was passed through the powder. At ∼600° C., the $TiCl_3$ and $BCl_3$ reacted fairly rapidly as indicated by evolved $TiCl_4$ collected as a liquid at room temperature. The weight of the final solid reaction product was in accordance with Eq. (3) above. X-ray diffraction and TEM analysis showed it to be $TiB_2$ with particle and particle aggregates sizes in the range ∼0.1 nm to ∼50 nm. The powder was pyrophoric as demonstrated by exposing a sample to air.

EXAMPLE III

Experiment A

Titanium metal powder (−4 to +40 mesh) was placed in a nickel metal reactor, and gaseous $BCl_3$ was passed through the powder. At 630° C., the reaction proceeded at a reasonable rate as indicated by evolved $TiCl_4$ which was collected as a liquid at room temperature. The weight of the final solid reaction product was in accordance with Eq. (5) above. X-ray diffraction and TEM analyses showed that the powder consisted of $TiB_2$ with particle and particle aggregate sizes in the range ∼1 nm to 100 nm. The powder pyrophoric.

Experiment B

Titanium metal powder (−325 mesh) was treated the same way as described in Experiment A. The weight of the final solid reaction powder product was in accordance with Eq. (5) above. X-ray diffraction and TEM analyses showed it to be crystalline $TiB_2$ with particle sizes less than 50 nm, mixed with amorphous material. The powder was very pyrophoric.

Experiment C

Titanium metal powder (−325 mesh) was treated in the same way as described in Experiment A with the exception that the reaction took place at 700° C. The result was the same as in Experiment B, except that the particle sizes were in the range ∼1 nm to ∼100 nm. This suggests that crystallization of amorphous $TiB_2$ takes place at 700° C.

Exploratory sintering tests on the $TiB_2$ powders were conducted at 35 MPa pressure and various temperatures. At 1400° C., some sintering was observed and at 1600° C. the density of the sintered pellets reached 96% of theoretical.

Hot pressing the powders at 35 MPa (∼4500 psi) into 1 gram pellets at temperature in the range 1400°–1700° C., without the use of any sintering aid, resulted in compaction densities of 98 to 99% of that of the theoretical value (=4.53 g/cm$^3$) at 1600° C.

EXAMPLE IV

Titanium metal powder (−4 to +40 mesh) was placed in a nickel reactor and treated as described under Example III, Experiment A. However, the reaction was stopped before it reach completion, and the intermediary solid reaction products were examined. The reaction products were layered in the sequence $TiB_2$−−($TiB_2+TiCl_3$)−($TiCl_2+TiB_2$)−Ti together with unidentified compounds. This demonstrates that $TiCl_2$ is an intermediate reaction product when $BCl_3$ reacts with Ti. This also demonstrates that $TiCl_2$ may serve as a starting material for the synthesis of $TiB_2$ powder by direct reaction with $BCl_3$, in accordance with Eq. (4) above.

EXAMPLE V

Zirconium metal powder (−50 mesh) was placed in a nickel boat, inserted into a nickel combustion tube and heated in a tube furnace for two hours at 650° C. under a flow of $BCl_3$. About 85% of the metal was converted to submicron $ZrB_2$ powder as ascertained by X-ray diffraction (line broadening). Based on the chemical similarity of zirconium and hafnium, it is expected that $HfB_2$ powder can be formed in this manner.

What is claimed is:

1. An improved method for preparing titanium diboride powder consisting essentially of reacting, at a temperature in the range 600°–1100° C., boron trichloride with titanium powder in the presence of sufficient additional amount of titanium powder to act as chlorine acceptor, for a period of time sufficient to form titanium diboride powder product having a particle size in the range 0.001–0.1 microns.

* * * * *